United States Patent [19]
Song et al.

[11] Patent Number: 5,949,999
[45] Date of Patent: Sep. 7, 1999

[54] SOFTWARE TESTING AND REQUIREMENTS TRACKING

[75] Inventors: Xiping Song, Princeton, N.J.; Daniel J. Paulish, Yardley, Pa.

[73] Assignee: Siemens Corporate Research, Inc., Princeton, N.J.

[21] Appl. No.: 08/755,993

[22] Filed: Nov. 25, 1996

[51] Int. Cl.⁶ .................................................. G06F 19/00
[52] U.S. Cl. .......................................... 395/701; 595/712
[58] Field of Search ..................................... 395/701, 712; 707/500

[56] References Cited

U.S. PATENT DOCUMENTS

| | | | |
|---|---|---|---|
| 5,291,405 | 3/1994 | Kohari | 707/500 |
| 5,430,873 | 7/1995 | Abe | 395/702 |
| 5,452,206 | 9/1995 | Turrietta et al. | 395/701 |
| 5,815,717 | 9/1998 | Stack | 395/705 |

OTHER PUBLICATIONS

J.D. Arthur and K. T. Stevens, "Assessing the Adequacy of Documentation Through Document Quality Indicators," Conf. on Software Maintenance, pp. 40–49, Oct. 1989.

P.–J. Courtois and D. L. Parnas, "Documentation for Safety Critical Software," 15th Int'l. Conf. on Software Engineering, pp. 315–323, May 1993.

H.M. Sneed, "Automated Tool Support for ANSI/IEEE STD: 829–1983 Software Test Documentation," Software Engineering Standards Symposium, pp. 308–316, Aug. 1993.

A.D. Lincoln, "Computer Aided Documentation for Software Maintenance," IEE Colloquium on Issues in Computer Support for Documentation and Manuals, pp.7/1–7/3, Dec. 1993.

T.T. Moores and R.E.M. Champion, "Software Quality Through the Traceability of REquirements Specifications," First Int'l. Conf. on Software Testing, Reliability and Quality Assurance, pp. 100–104, Dec. 1994.

M.L. Manwaring, et al., "Design by Documentation: A Method and Case Study," Eighth IEEE Symp. on Computer–Based Medical Systems, pp. 272–277, Jun. 1995.

"Code Analysis Documentation, and Testing Tools," DBMS, vol. 9(6), pp. 44(4), Jun. 1995.

T. Sreemani and J.M. Atlee, "Feasibility of Model Checking Software REquirements: A Case Study," Eleventh Annual Conf. on Computer Assurance, pp. 77–88, Jun. 1996.

*Primary Examiner*—Robert W. Downs
*Attorney, Agent, or Firm*—Donald B. Paschburg

[57] ABSTRACT

A system for guiding the browsing/tracking of software development documents and their relationships contains several components. A procedure definition defines the software development procedure. An interface allows users to select phase, activity, and system components and execute other utility programs or choose options. A browser interpreter interprets the selection and decides how to form and execute each command. A command-composer composes the commands for execution. A project file contains the information about system components, physical locations of the system documents, documentation tools associated with documents, options selected, hyper-links to the documents, etc . . . A state-checker checks the status of the documents and reports it upon the users' request and a document repository stores documents.

20 Claims, 3 Drawing Sheets

FIG. 3

| | Project Document Manager (Browser)(SOMARIS/4) | | | | |
|---|---|---|---|---|---|
| Project View Tools | | | | | |
| ◇ Requirement | ◇ Plan | ◇ Design | ◇ Implementation | ◇ Integration Test | ◇ System |

| Activity | System Function |
|---|---|
| ◇ Overview | Patient and File Function |
| ◇ Planning | General Servers and Tools |
| ◇ Hazard Analysis | Measurment |
| | Imaging |
| ◇ Hazard Test | Filming |

Status of Component (Measurement)

| Requirement | Plan | Design | Implementation | Integra |
|---|---|---|---|---|
| Overview | ☐ Overview | ▨ Overview | ☐ Overview | ☐ Overv |
| Planning | ☐ Planning | ☐ Planning | ☐ Planning | ☐ Plann |
| Hazard Analysis | ☐ Hazard Analysis | ☐ Hazard Analysis | ☐ Hazard Analysis | ☐ Hazar |
| Hazard Test | ☐ Hazard Test | ☐ Hazard Test | ☐ Hazard Test | ☐ Hazar |
| Periodic Review | ☐ Periodic Review | ☐ Periodic Review | ☐ Periodic Review | ☐ Perio |
| Brief Review | ☐ Brief Review | ☐ Brief Review | ☐ Brief Review | ☐ Brief |
| Inspection | ☐ Inspection | ☐ Inspection | ☐ Inspection | ☐ Inspe |

Available      Not Available      Not Needed

SOFTWARE TESTING AND REQUIREMENTS TRACKING

BACKGROUND OF THE INVENTION

1. Field of the Invention

The present invention relates to software documentation and more particularly to the browsing/tracking of software development documents.

2. Description of the Prior Art

The validation of safety-critical software products (e.g., medical products, transportation) requires more carefully controlled design, testing, and reengineering than non safety-critical products. In software engineering, better control/tracking of software development documents such as test results and design specifications can improve the safety characteristics of developed products.

Validation is concerned with establishing and documenting that a product implements its specified functionality, as well as tracking the relationships between requirements, specifications, components, and validation artifacts such as problem reports, reviews and test data. For safety-critical products, validation also involves demonstrating to internal or external auditors that the traceability from requirement definitions to testing has been well maintained. Additional testing and reviews are usually performed for safety-critical software functions. An emphasis is placed on formal change control procedures and supporting documentation for changes. Documented evidence must be provided demonstrating adherence to validation and engineering procedures. The approach and results applied to software testing must be documented and tracked, including the rationale for the level of testing performed and the recording of specific "critical" data for test procedures.

SUMMARY OF THE INVENTION

The present invention is a mechanism that integrates software engineering and system components to guide the browsing/tracking of software development documents (e.g., requirement, design, testing, etc.) and their relationships. This capability is useful for an organization to manage their software documents and to demonstrate to auditors how they have used their software development procedures for developing and validating safety-critical software systems.

The system contains a procedure definition which defines the software development procedure. An interface allows users to select phase, activity, and system components and execute other utility programs or choose options. A browser interpreter interprets the selection and decides how to form and execute each command. A command-composer composes the commands for execution that invoke the documentation tool that loads the document portion from the desired location of the document. A project file contains the information about system components, physical locations of the system documents, documentation tools associated with documents, options selected, hyper-links to the documents, etc . . . . A state-checker checks the status of the documents and reports it upon the users' request. Also, a document repository stores documents. The document repository could be one or a number of directories on the computer's file system.

BRIEF DESCRIPTION OF THE DRAWINGS

FIG. 3 illustrates a status report panel of one embodiment of the present invention.

DETAILED DESCRIPTION OF THE INVENTION

Figure 1:
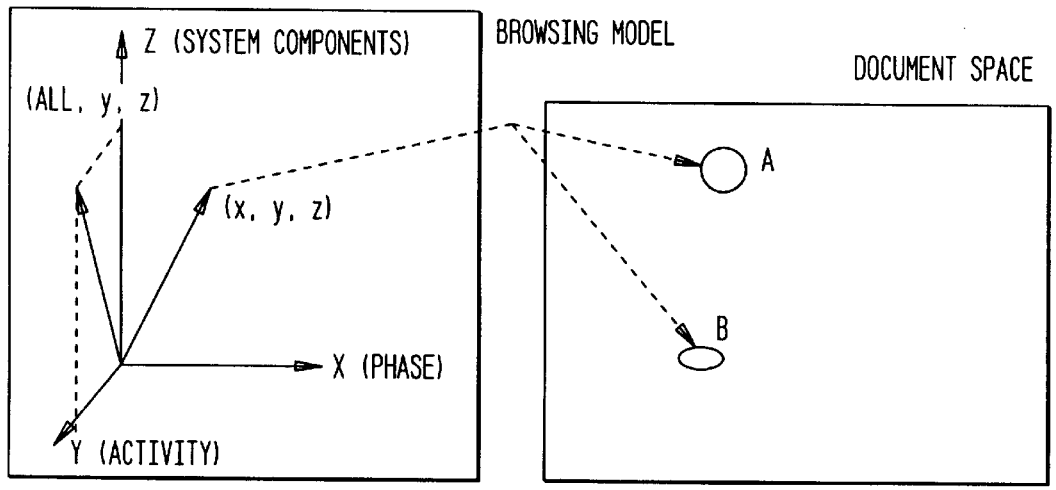
FIG. 1 illustrates a conceptual model of the integrated document browsing of the present invention.

As discussed above, developing safety-critical software systems often requires detailed documentation of the software systems, and the use of well-defined, systematic procedures. Regulatory agencies (e.g., FDA, FAA) audit the practices of manufacturers by checking if product developers have followed their software development procedures, if they have produced the accordingly required documents, and if they have maintained the traceability between the related documents (particularly between requirements and testing documents). Thus, preparing for such audits and demonstrating the use of development procedures and management of traceability are critical for any organization that produces safety-critical software systems.

As this "procedure-and traceability-oriented" audit is still relatively new, no support has been directly developed for the preparation and execution of the audit. General hypertext technologies could be useful for carrying out these activities as it helps users to browse the documents through hypertext links. General hypertext technology is described by J. Conklin in "Hypertext: An Introduction and Survey", IEEE Computer, pages 17–40, September 1987. The hypertext links are usually built upon the table of contents, reference to figures, enumerated items, key words, etc . . . . Though this is helpful for browsing, it does not provide a mechanism for directly relating the software documents with the organization's software development procedures within the context of specific product developments. Thus, the general hypertext technology offers no support for demonstrating the use of the procedure in terms of characteristics (e.g., completeness, revision history) of the documents produced by the procedure. The general hypertext technology does not address the problem of how to track the special relationships among the software documents like those between requirements and testing. The present invention described below provides such a mechanism.

In addition, managing a large volume of software testing and requirement documents produced while developing the software system is also extremely important for maintaining safety-critical products. A company must be able to find the desired portions of documents in short time in order to solve its customers' problems quickly. For any reported safety-related accident, the company will need to check the requirements, test cases, and testing procedures that have been performed under a similar situation. Thus, quickly locating the desired documents (including their relationships) based upon the development procedures is very important. The tool of the present invention is also useful for such applications. Furthermore, such a tool can be useful for new development/maintenance team members to quickly locate the desired documents, become familiar with the software and work more effectively.

The present invention is an approach for tracking software development documents. To validate this approach a tool (called STAR-Track, standing for Software Testing And Requirements-Tracking) was developed that implements the approach. The present invention validates safety-critical software products by controlling and tracking the relationships of the documents used for testing, design, and reengineering (e.g., for retrospective validation).

The Integrated Document Browsing (IDB) model of the present invention introduces a new mechanism for browsing software requirements, design and testing documents. This mechanism views the software document space consisting of three conceptual dimensions. Thus, browsing the documents through these three dimensions should be most effective. The conceptual model of integrated document browsing is shown in FIG. 1.

The first dimension, "Phases", as shown in FIG. 1, are stages of the software development within which certain software activities are carried out and certain software documents are produced. For example, a software development procedure may define that, in the software implementation phase, requirements should exist and the code inspection activity should be performed. The second dimension, "Activities", as shown in FIG. 1, are tasks carried out during the software development. An activity might need to be performed in multiple phases. The third dimension, "System Components", as shown in FIG. 1, are parts of the software system, which might be identified through its functions or from the system architecture.

That is, as FIG. 1 illustrates, a point (x, y, z) in this conceptual space is to be mapped to one piece (or pieces) of documents that are produced by activity x within phase y, and that is about system component z. Thus, by selecting a system component z, activity y and phase x, a user can use a tool which is based upon this integrated model to quickly check whether the related pieces of documents have been produced. For example, a user may trace whether the requirement specification of the filming component of a CT (Computerized Tomography) device has been inspected. In such a case the phase is Requirement, the activity is Inspect. By browsing, the user can quickly find the inspection report. In a similar fashion, users can show to the auditors how the system component has been inspected or tested in accordance with its development procedures.

This "three dimensional" browsing/tracking mechanism is based upon previous research in definitions of software development life-cycle models. Software development life-cycle models of many organizations have such a structure.

The IDB approach of the present invention has the following advantages over any existing prior art approaches:
1. Supports the easy checking/tracking of software documents against steps of software development procedures. This is extremely valuable for preparing for an audit of the development of a safety-critical software system and useful for maintaining and tracking the software system.
2. Supports the effective document review and product validation. Since the model that guides the browsing/tracking is the same as the development procedure of the organization, users can easily understand the model, quickly locate the desired software documents, and ensure the completeness of the documents.
3. Supports users to define which procedures and documents should be required during the project execution. The set of required documents and procedures will change depending on the software component they are associated with. For example, activity Hazard Analysis may not need to be carried out on a non-safety-critical software component. This variant of the organization's development procedure can be easily represented by the mechanism and changes depending on the selected system component.

The IDB approach is based upon the assumption that the software documents have been developed using other word-processing/editing tools. The approach is not for guiding the development of these documents, rather only for managing/tracking them. This assumption is not uncommon for applications that use software document tracking techniques.

Figure 2:
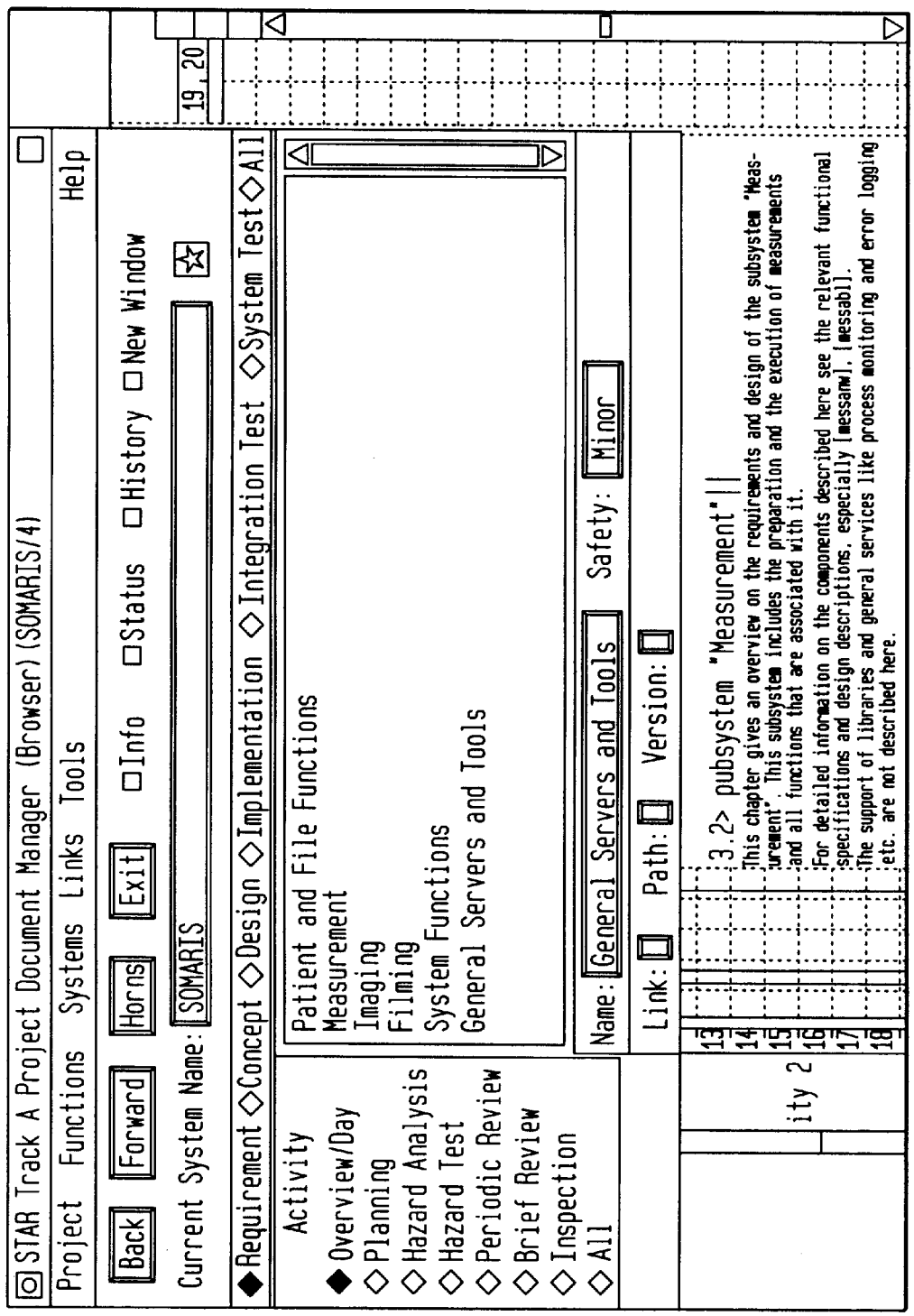
FIG. 2 illustrates a user interface design of one embodiment of the present invention.

The following will describe the detailed description of the present invention. FIG. 2 shows the user interface design of the IDB browser of the present invention. The menu bar allows users to open a project, to list system components, to view the documents and to access other tools. The radio buttons right below the menu bar allow users to select a phase. The radio buttons at the left allow users to select an activity. The system components listed at right allow users to select a system component.

With the IDB model as the foundation, the present invention provides the following capabilities:
1. Document browsing: Accomplished by:
   a. Select a project and list system components.
   b. Select system component, or select phases (as listed under the menu bar) by which the desired documents are produced.
   c. Select which activity (as listed in the left of the window) by which the desired documents are produced.
   d. A double-click on a system component listed in the list box will result in the opening of the file that shows that piece of the document. A single click on a system component will result in the highlight of that selected component which indicates the current selection.
2. Display the customization of activities: Accomplished by:
   a. Load in the system component list.
   b. Select a system component from the system component list.
   c. A selection on the phase radio button will result in some activity radio buttons disabled, which indicates which activities have been omitted for the development of this system component.
3. Browse and extract portions of documents: Accomplished by:
   a. Select an All radio button either as a phase or an activity. FIG. 2 shows that Activities have an All radio button. Similarly, Phases have an All radio button (because of the size limit of the page, the figure does not show this button). That is, a user can select either the All button in the activity column or the All button in the phase row. The tool does not allow the selection of both All buttons.
   b. Select a phase or an activity and the selection must be different from the All button selected. For example, if the All button in the phase button row has already been selected, you can only select an activity as a portion of the document you want to browse.
   c. A double click will result in the opening of these portions of documents. Upon your approval by clicking appropriate buttons, a document containing those portions might be generated or printed out. A single click on a system component will result in the highlight of that selected component, which indicates the current selection.
4. Check the status of the documents: Turning on the status check button and then double clicking on a system component will result in the opening of the progress status panel as shown in FIG. 3. Each column in the panel shows the status of the document within one development phase. A marked activity shows that the document is available (e.g., Design/Overview). Hidden activities are those omitted. Others are yet to be developed. This illustrates that the IDB mechanism is very convenient for building such a progress checking tool.

Figure 4:
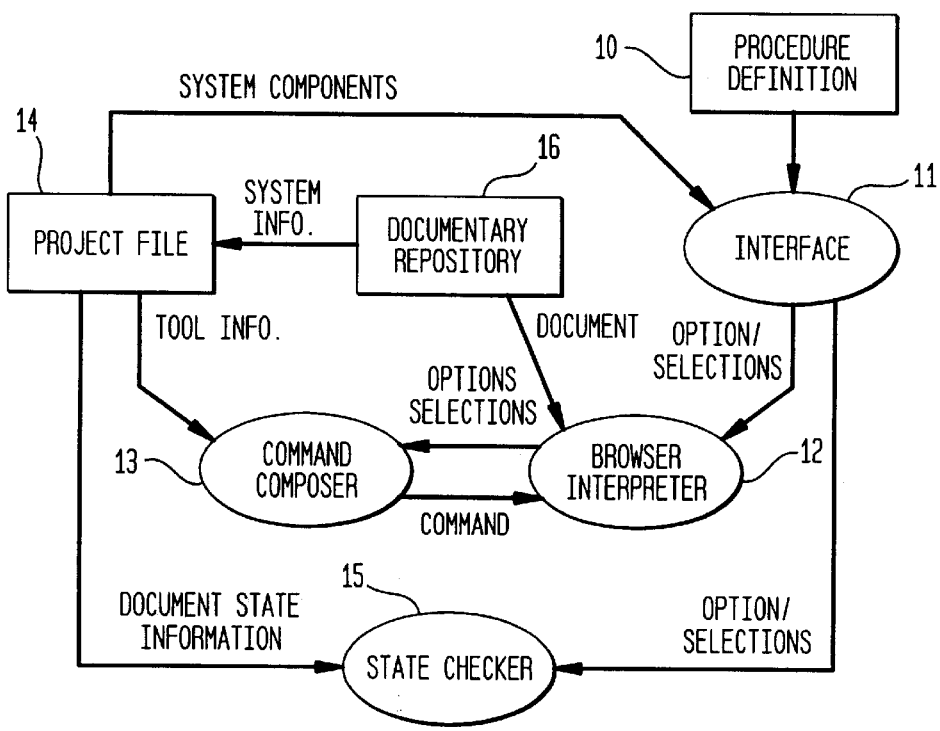
FIG. 4 illustrates a data flow representation of one embodiment of the present invention.

The following will describe the design and implementation of the present invention. As FIG. 4 illustrates, the system contains the following components. Procedure definition 10 defines the software development procedure. Specifically, it defines what phases and activities the procedure should have. It gives names of the phases and activities. Procedure definition 10 is connected to interface 11 which is the graphical user interface that allows users to select phase, activity, and system components. With the selection, users can invoke the relevant document. quickly. With interface 11, users can also execute other utility programs or choose options. Interface 11 is connected to browser interpreter 12 which interprets the selection users entered through the graphical user interface and decides how to construct and execute each command. Browser interpreter 12 transmits options selections to command-composer 13 which composes the command for execution that invokes the documentation tool that loads the document from the desired location of the document. It needs to know the information about the documentation tool that is associated with the documents. Command-composer 13 gets this information from project file 14 and transmits this information back to browser interpreter 12. Project file 14 contains the information about system components and related documents produced through the software procedure. It also describes the physical document locations (e.g., page numbers) where the system documents are discussed, documentation tools (e.g., Framemaker) associated with documents, selected options of the tool, version of the documents, etc . . . . Project file 14 transmits system components information to interface 11 and transmits document state information to state-checker 15 which examines the state of a system component and displays the result upon the users' request. State checker 5 also receives options/selections from interface 11. The state is represented in terms of the procedure used to develop this component. The state shows if a certain activity has been performed for the component and if resulting documents have been released. Also included in the system is document repository 16 which is connected to browser interpreter 12 and project file 14. Document repository 16 is where the documents are stored It could be one or a number of directories on the computer's file system. Document repository 16 sends system information to project file 14 and documents to browser interpreter 12.

The following is the process for how the integrated document browsing system of the present invention works The, STAR-Track tool described above is used to implement the present invention:

1. Users must define their software development procedure in terms of phases and activities. Then, the user customizes STAR-Track to the process by changing the STAR-Track program script.
2. When the users start the STAR-Track, STAR-Track loads project file 14 into the program memory for use.
3. When users use STAR-Track to browse documents, their selection that includes certain phase, activity, and components, will be passed to browser interpreter 12 for interpretation. Then the selection will be passed to command composer 13.
4. Command composer 13 will use the information provided by project file 14 to properly put the tool name, option name, document name, document location mark together for browser interpreter 12 to execute.
5. The execution of the command will open the document at the location as the users desired.

As stated above, the present invention allows for an organization to demonstrate how they have used their software development procedures in developing safety-critical software systems and to show how thoroughly they have validated their products. The present invention is also useful for maintaining any large software system which was developed using well defined development procedures.

It is not intended that this invention be limited to the software arrangement or operational procedures shown disclosed. This invention includes all of the alterations and variations thereto as encompassed within the scope of the claims as follows.

We claim:

1. A system for software testing and requirements tracking comprising:

a procedure definition for defining phases and activities of a software development procedure;

an interface connected to said procedure definition for allowing a user to select at least one of phase, activity and system components;

a browser interpreter connected to said interface for interpreting the selection of the user;

a command composer connected to said browser interpreter for composing commands based upon the interpreted selection of the user;

a project file connected to said command composer and said interface;

a state checker connected between said projet file and said interface; and, a document repository connected between said browser interpreter and said project file.

2. A system for software testing and requirements tracking as claimed in claim 1 wherein said procedure definition comprises:

a software development procedure that is connected to said interface.

3. A system for software testing and requirements tracking as claimed in claim 1 wherein said interface comprises:

a graphical user interface that allows users to select the phase, activity and system components.

4. A system for software testing and requirements tracking as claimed in claim 3 wherein said phase comprises:

a plurality of stages of software development wherein certain software activities are carried out and certain software documents are produced.

5. A system for software testing and requirements tracking as claimed in claim 3 wherein said activity comprises:

a plurality of tasks carried out during software development.

6. A system for software testing and requirements tracking as claimed in claim 3 wherein said system components comprises:

a plurality of parts of a software system which could be identified through its functions or from system architecture.

7. A system for software testing and requirements tracking as claimed in claim 1 wherein:

said interface allows users to execute other utility programs or choose options.

8. A system for software testing and requirements tracking as claimed in claim 1 wherein:

said browser interpreter interprets a selection entered through said interface and decides how to construct and execute each command.

9. A system for software testing and requirements tracking as claimed in claim 1 wherein:

said command composer composes a command for execution that invokes a documentation tool that loads a document from a desired location.

10. A system for software testing and requirements tracking as claimed in claim 9 wherein:

said command composer receives information from said project file about said documentation tool that is associated with said document and transmits said information back to said browser interpreter.

11. A system for software testing and requirements tracking as claimed in claim 1 wherein:

said project file contains information about related documents produced through a software procedure and describes physical document locations.

12. A system for software testing and requirements tracking as claimed in claim 1 wherein:

said state checker examines state of said system component and displays results upon a request of user.

13. A system for software testing and requirements tracking as claimed in claim 1 wherein said document repository comprises:

stored documents.

14. A system for software testing and requirements tracking as claimed in claim 13 wherein:

said document repository sends system information to said project file and sends said stored documents to said browser interpreter.

15. A system for software testing and requirements tracking as claimed in claim 1 wherein said document repository comprises:

one or a number of directories on a computer's file system.

16. A method of software testing and requirements tracking comprising the steps of:

defining a software development procedure with respect to phases and activities;

allowing users to select phase, activity and system components therefore providing a selection;

interpreting said selection and deciding how to construct and execute each command;

composing a command for execution;

providing a project file to describe physical document locations; and examining state of system component.

17. A method of software testing and requirements tracking as claimed in claim 16 wherein allowing users to select phase comprises the steps of:

carrying out certain software activities; arid, producing certain software documents.

18. A method of software testing and requirements tracking as claimed in claim 16 wherein allowing users to select activities comprises the step of:

carrying out tasks during software development.

19. A method of software testing and requirements tracking as claimed in claim 16 wherein allowing users to select system components comprises the step of:

searching through parts of a software system which are identified.

20. A method of software testing and requirements tracking as claimed in claim 16 further comprising the step of:

providing a document repository for storing documents.

\* \* \* \* \*